United States Patent
Sahinoglu et al.

(10) Patent No.: US 9,633,490 B2
(45) Date of Patent: Apr. 25, 2017

(54) SYSTEM AND METHOD FOR TESTING AND EVALUATING VEHICLE COMPONENTS

(71) Applicant: Mitsubishi Electric Research Laboratories, Inc., Cambridge, MA (US)

(72) Inventors: Zafer Sahinoglu, Cambridge, MA (US); Oncel Tuzel, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/736,463

(22) Filed: Jun. 11, 2015

(65) Prior Publication Data

US 2016/0364922 A1    Dec. 15, 2016

(51) Int. Cl.
*G01M 17/00* (2006.01)
*G07C 5/08* (2006.01)
*G01S 19/42* (2010.01)
*G07C 5/00* (2006.01)

(52) U.S. Cl.
CPC .......... *G07C 5/0808* (2013.01); *G01S 19/42* (2013.01); *G07C 5/008* (2013.01)

(58) Field of Classification Search
CPC ....... G07C 5/0808; G07C 5/008; G01S 19/42; G06F 17/00; G06F 15/16
USPC ............ 701/29.1, 31.4, 32.8; 709/201, 202; 705/35, 4, 7.38
See application file for complete search history.

(56) References Cited

U.S. PATENT DOCUMENTS

| | | | | |
|---|---|---|---|---|
| 8,290,661 B2* | 10/2012 | Han | ................. | G01R 31/007 701/32.8 |
| 8,539,825 B2* | 9/2013 | Beckwith | ............. | B60T 17/221 73/118.01 |
| 2003/0125845 A1* | 7/2003 | Carlstedt | ............... | G08G 1/161 701/1 |
| 2003/0236603 A1* | 12/2003 | Lu | ...................... | B60G 17/016 701/37 |
| 2010/0057290 A1* | 3/2010 | Brillhart | ............... | G06Q 10/06 701/31.4 |
| 2010/0208076 A1* | 8/2010 | Kinoshita | ......... | G06K 9/00791 348/148 |
| 2011/0184784 A1* | 7/2011 | Rudow | ................. | G06Q 30/02 705/7.38 |
| 2012/0020216 A1* | 1/2012 | Vashist | .................. | H04L 41/14 370/235 |

(Continued)

*Primary Examiner* — Shardul Patel
(74) *Attorney, Agent, or Firm* — Gene Vinokur; James McAleenan; Hironori Tsukamoto

(57) ABSTRACT

A vehicle includes a set of devises for determining a state of the vehicle at an instant of time and a processor operatively connected to a memory for processing parameters of the state of the vehicle collected over a plurality of instances of time for a period of time from an initial instance of time till a current instant of time to determine a set of driving conditions leading to a current state of the vehicle at the current instant of time. Each driving condition indicates a condition of an operation of the vehicle for the period of time. The vehicle also includes a communication module for outputting the current state of the vehicle determined by the set of devices at the current instant of time and for outputting the set of driving conditions leading to the current state of the vehicle.

17 Claims, 12 Drawing Sheets

(56) References Cited

U.S. PATENT DOCUMENTS

| | | | |
|---|---|---|---|
| 2013/0073605 A1* | 3/2013 | Fosburgh | G06F 11/3013 709/202 |
| 2015/0112733 A1* | 4/2015 | Baker | G06Q 40/08 705/4 |
| 2015/0213519 A1* | 7/2015 | Krishnamurthy | G06Q 30/0283 705/35 |

* cited by examiner

SYSTEM AND METHOD FOR TESTING AND EVALUATING VEHICLE COMPONENTS

FIELD OF THE INVENTION

This invention relates generally to a system and a method for testing and evaluating a vehicle or components of the vehicle, and more particularly a system and a method for evaluating a performance of the components of the vehicle under different operating conditions.

BACKGROUND OF THE INVENTION

Usually, any component of a vehicle is tested before being deployed on the vehicle. Such a testing is necessary to ensure that the component can properly operate without malfunctioning during an operation of the vehicle. Throughout a product development cycle, the design performance of one or more vehicle components is typically tested through simulation. For example, the performance of components in a manual transmission system or a brake system can be determined under various component designs or arrangements, see e.g., U.S. Pat. No. 8,539,825. Similarly, after a newly developed vehicle component is mounted on a vehicle, performance of the component or erroneous operation of the component can be tested during various driving tests and/or additional simulations, see, e.g., U.S. Pat. No. 8,290,661.

However, the simulation of the operating conditions or selected conditions for the different driving tests do not reflect the multitude of actual operational conditions of the modern vehicles. With the advancement of the global market, the vehicles of the same model can be deployed for the usage under different terrain and weather conditions, and can undergo different driving styles and extend of use. It is just difficult and impractical to test the components of the vehicle under all possible driving conditions.

There is a need for a system and a method for evaluating performance of a vehicle and/or components of the vehicle operating under different driving conditions.

SUMMARY OF THE INVENTION

It is an object of one embodiment of an invention to provide a system and a method for evaluating performance of a vehicle and/or components of the vehicle operating under different driving conditions. It is an object of another embodiment of the invention to evaluate and test various components of the vehicle operated under different, but actual driving conditions.

Some embodiments of the invention are based on recognition that a method for testing and/or evaluating a vehicle and/or components of the vehicle requires knowledge of at least two types of parameters. The first type of parameters describes the state of the vehicle at an instant of time, e.g., the time instant of measurements. The second type of parameters describes driving conditions leading to a current state of the vehicle at the current instant of time.

For example, the state of the vehicle can include a total distance traveled by the vehicle. Conversely, the driving conditions for the vehicle traveled the total distance can include a distribution of the distance over time, a ratio of city versus highway distance, a ratio of indoor versus outdoor parking, distribution of the weather condition over period of time for which the vehicle traveled that total distance. The knowledge of such driving conditions can be used to understand the effect of the traveled distance on different components of the vehicle.

For example, the state of the vehicle can include a level of fuel in the vehicle at the instant of time, and the driving condition relevant to such a state parameter can include a distribution of the level of fuel in the vehicle for the period of time. Such a time distribution of the level of fuel can be used to evaluate performance of a fuel injection system for admitting fuel into an internal combustion engine of the vehicle.

Some embodiments of the invention are based on recognition that when the operational conditions of the vehicle are simulated, the knowledge of those two types of parameters is readily available. For example, the parameters describing the current state of the vehicle can be measured using various sensing devises, and the driving conditions leading to the current state of the vehicles are parameters of simulation determined in advance. However, during the actual operation of the vehicle, the driving conditions leading to the current state of the vehicle are unavailable, e.g., not measured or discarded after the measurements. This usually is not considered as a problem, but as a fact of life, especially considering the multitude of different driving conditions.

Some embodiments of the invention are based on a realization that the driving conditions leading to the current state of the vehicle can be determined from parameters of the state of the vehicle collected over a plurality of instances of time for a period of time. Such a set of driving conditions can be outputted together with the current state of the vehicle, which allows testing and evaluating different components of the vehicle under actual conditions of the operation.

Additionally or alternatively, some embodiments of the invention use the determined driving conditions to compare conditions of different vehicles and/or performance of different combination of components, including the combination of components produced by different manufacturers. Additionally or alternatively, some embodiments of the invention determine the driving condition using a combination of measurements produced by measuring devises and other sensors currently installed on the vehicle. Those embodiments allow determining the driving conditions without installation of additional sensors.

Accordingly, one embodiment discloses a vehicle including a set of devises for determining a state of the vehicle at an instant of time, the set of devices includes an odometer for determining a total distance traveled by the vehicle at the instant of time; a processor for processing parameters of the state of the vehicle collected over a plurality of instances of time for a period of time from an initial instance of time till a current instant of time to determine a set of driving conditions leading to a current state of the vehicle at the current instant of time, such that each driving condition indicates a condition of an operation of the vehicle for the period of time; and a communication module for outputting the current state of the vehicle determined by the set of devices at the current instant of time and for outputting the set of driving conditions leading to the current state of the vehicle.

Another embodiment discloses a system in communication with a set of vehicles, wherein the system receives a current state and driving conditions of each vehicle and determines a condition of the vehicle based on a function of the current state and the driving conditions of the vehicle. Each vehicle includes a set of devises for determining a state of the vehicle at an instant of time, the set of devices includes an odometer for determining a total distance traveled by the vehicle at the instant of time; a processor operatively connected to a memory for processing parameters of the state of the vehicle collected over a plurality of instances of time for a period of time from an initial instance of time till a current instant of time to determine a set of driving conditions leading to a current state of the vehicle at the current instant of time, such that each driving condition indicates a condition of an operation of the vehicle for the period of time; and a communication module for outputting the current state of the vehicle determined by the set of devices at the current instant of time and for outputting the set of driving conditions leading to the current state of the vehicle.

DETAILED DESCRIPTION OF THE EMBODIMENTS

A method for testing and/or evaluating a vehicle and/or components of the vehicle requires knowledge of at least two types of parameters. The first type of parameters describes the state of the vehicle at an instant of time, e.g., a time instant of measurements. The second type of parameters describes driving conditions leading to a current state of the vehicle at the current instant of time.

Figure 1:
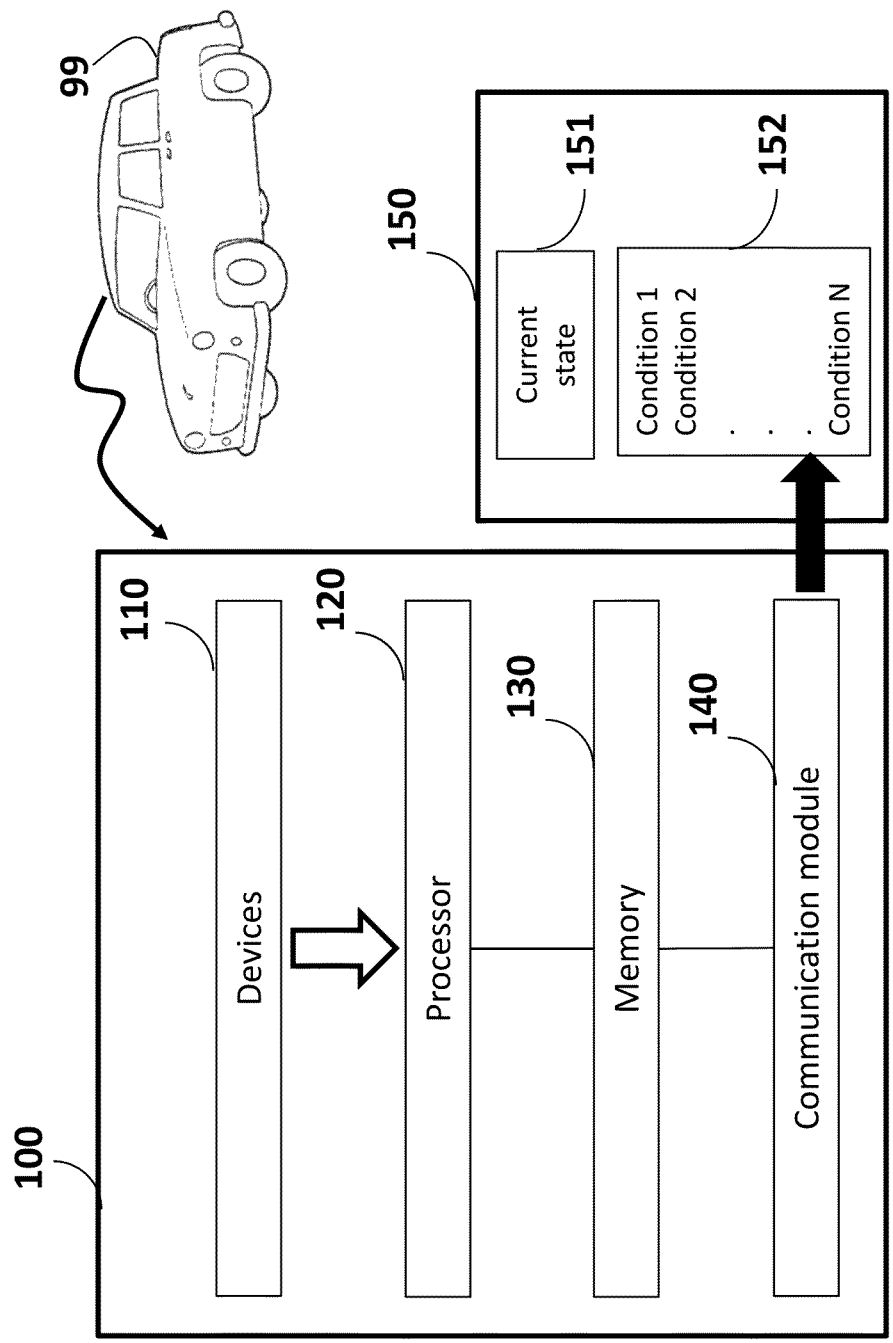
FIG. 1 is a block diagram of a unit of a vehicle according to some embodiments of invention.

FIG. 1 shows a block diagram of a unit 100 of a vehicle 99 according to some embodiments of invention. The unit 100 includes a set of devices 110 for determining a state of the vehicle at an instant of time. The set of devices can include different sensor for measuring the state of the vehicle and/or a component of the vehicle. The devices 110 include an odometer for determining a total distance traveled by the vehicle at the instant of time.

The unit 100 also includes a processor 120 connected to a memory 130 for processing parameters of the state of the vehicle collected by the devices 110 over a plurality of instances of time for a period of time. For example, the processor determines the state of the vehicle at each instance of time from an initial instance of time till a current instant of time and stores those set of states in the memory. An aggregation of the set of states over a plurality of instances of time determines a set of driving conditions leading to a current state of the vehicle at the current instant of time.

As contrasted with the state of the vehicle at the instant of time, each driving condition indicates a condition of an operation of the vehicle for the period of time. For example, the state of the vehicle can include a total distance traveled by the vehicle. Conversely, the driving conditions for the vehicle traveled the total distance can include a distribution of the distance over time, a ratio of city versus highway distance, a ratio of indoor versus outdoor parking, distribution of the weather condition over period of time for which the vehicle traveled that total distance. The knowledge of such driving conditions can be used to understand the effect of the traveled distance on different components of the vehicle.

Some embodiments of the invention are based on recognition that the driving conditions leading to the current state of the vehicle 152 can be determined from parameters of the state of the vehicle collected from the devices 110 over a plurality of instances of time for a period of time. Such a set of driving conditions combined together with the current state of the vehicle 151 forms the overall vehicle condition 150, which allows testing and evaluating different components of the vehicle under actual conditions of the operation. For example, the state of the vehicle can include a level of fuel in the vehicle at the instant of time, and the driving condition relevant to such a state parameter can include a distribution of the level of fuel in the vehicle for the period of time. Such a time distribution of the level of fuel can be used to evaluate performance of a fuel injection system for admitting fuel into an internal combustion engine of the vehicle.

The unit 100 also includes a communication module 140 for outputting the current state of the vehicle determined by the set of devices at the current instant of time and for outputting the set of driving conditions leading to the current state of the vehicle. For example, the communication module 140 can transmit the current state and the driving conditions of the vehicle to an external system that determines a condition of the vehicle based on a function of the current state and the driving conditions.

Additionally or alternatively, the external system can be in communication with the communication module of multiple vehicles 99, which allows the system to evaluate the condition of one vehicle with respect to the condition of another vehicle. For example, such a comparison can be useful for evaluation performance of a component of a vehicle operating under different driving conditions.

Figure 2:
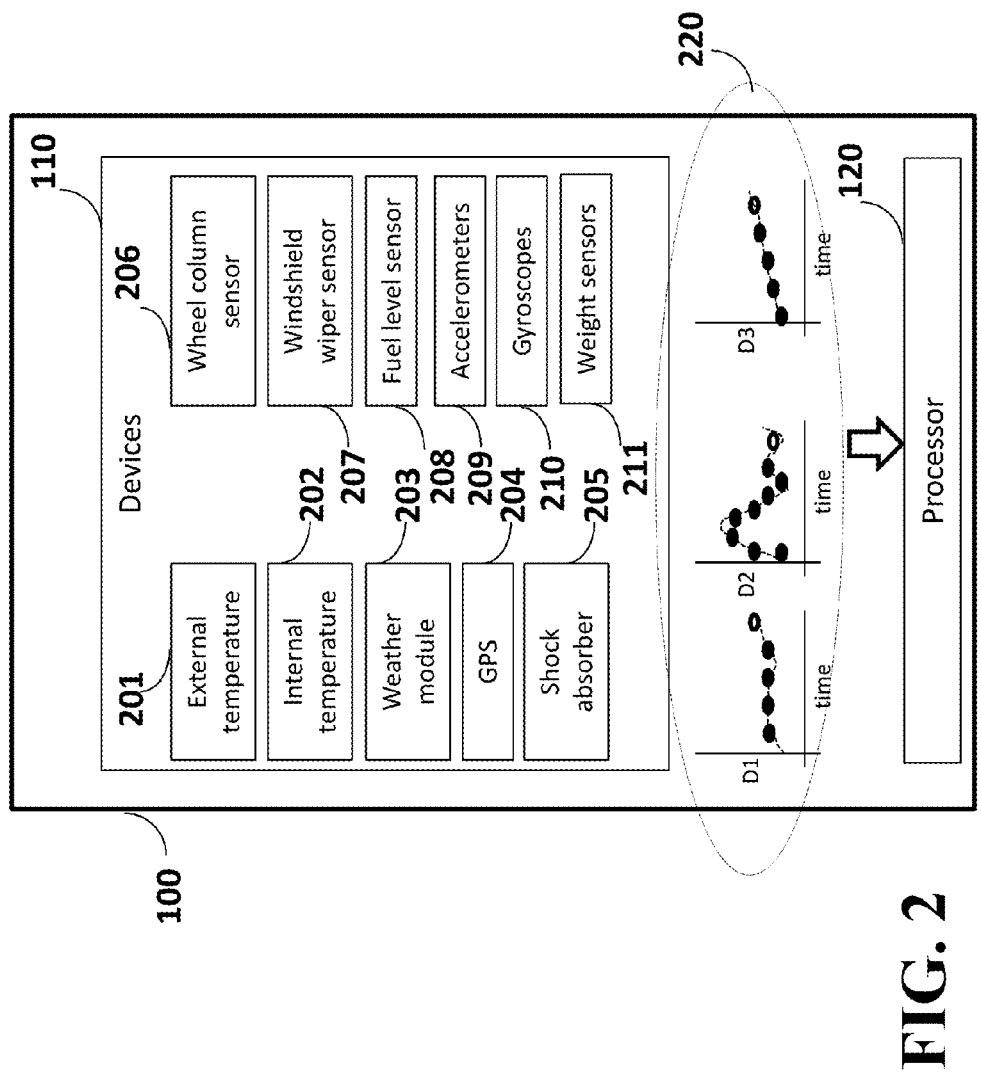
FIG. 2 is a block diagram of different devises employed by some embodiments of the invention.

For example, in one embodiment, the system receives the current state and the driving conditions from a first vehicle and receives the current state and the driving conditions from a second vehicle and determines a condition of the first vehicle with respect to a condition of the second vehicle based on a function of the current state and the driving conditions of the first and the second vehicles FIG. 2 shows a block diagram of different devises employed by some embodiments of the invention. For example, the devices 110 of the unit 100 can include one or combination of different sensors, such as temperature sensors for measuring an external temperature 201 and/or internal temperature 202, a weather module 203 for determining different weather conditions, e.g., raining, snowing, sunny, a global positioning system (GPS) receiver 204 for determining the location of the vehicle, e.g., longitude, latitude and altitude of the vehicle. The devices 110 can also include a shock sensor 205, a wheel column sensor 206, a windshield wiper speed sensor 207, a fuel level sensor 208, multi-axis accelerometers 209, gyroscopes 210 and weight sensors 211. Multiple data points from these devices are measured in time 220 and submitted to the processor 120 for analysis. The period of the readings for each sensor device 110 can be different.

In different embodiments, the driving conditions are determined using one or a combination of the devices 110. For example, the driving conditions can include one or combination of a ratio of city versus highway distance, a ratio of indoors versus outdoors parking, a parameter indicative of a distribution of the weather conditions for the period of time, a parameter indicating amount of excessive shock impulses acted on the vehicle within the period of time, a parameter indicating amount excessive acceleration or deceleration of the vehicle within the period of time. Different embodiments select measurements of one or combination of the devices 110 to determine the corresponding driving condition.

Figure 3:
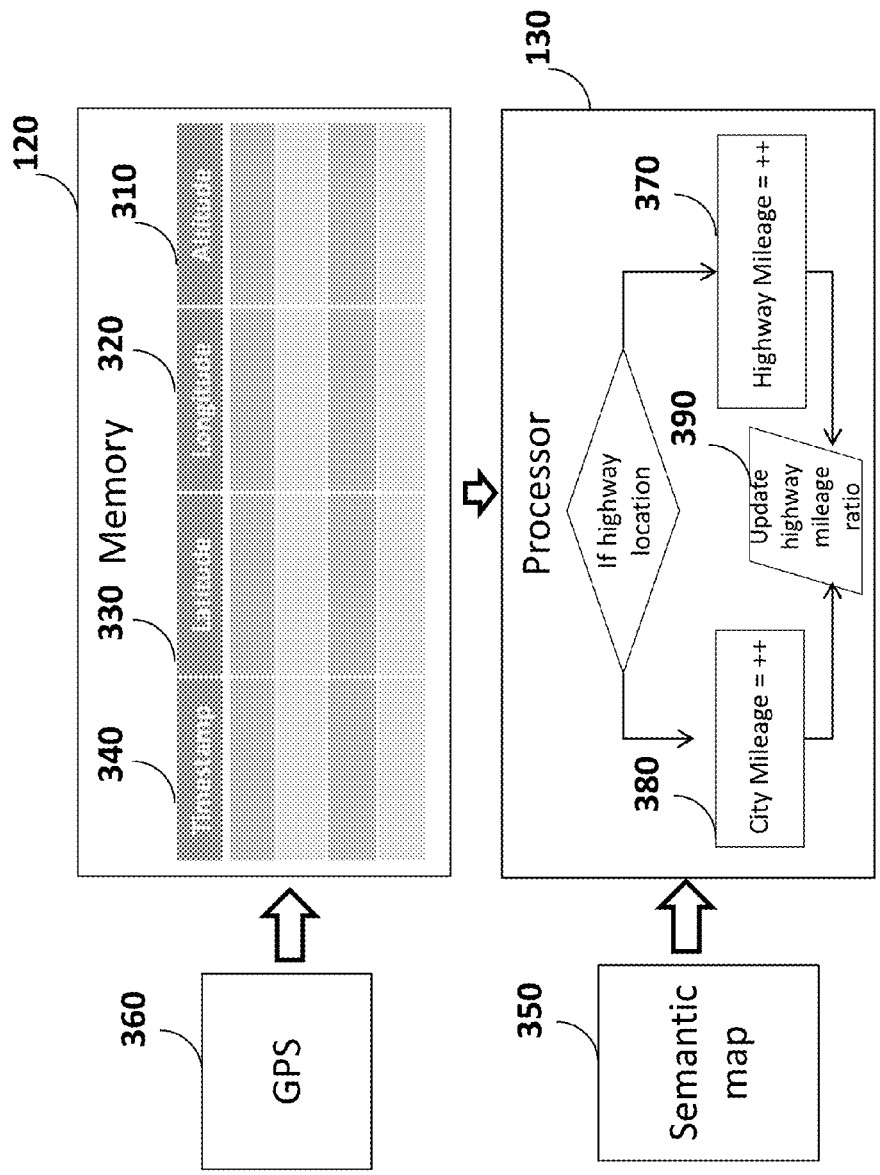
FIG. 3 is a schematic of a method for determining a ratio of highway distance versus city distance of a vehicle according to some embodiments of the invention.

FIG. 3 shows a schematic of a method for determining a ratio 390 of highway distance to city distance of a vehicle according to some embodiments of the invention. In this embodiment, the set of driving conditions includes the ratio 390 and the processor identifies a type of the location as a city location or a highway location using a map and determines the ratio based on the types of the location aggregated the period of time. The ratio 390 can serve as an indicator of distribution of forces affecting the components of the vehicle.

The embodiment uses the GPS sensor 360 for determining highway distance ratio 390. For example, the embodiment can use a semantic map 350 and a set of GPS information 120, e.g., timestamp 340, latitude 330, longitude 320 and altitude 310, of the vehicle to determine if the vehicle is moving on a highway or in a city. Semantic map 350 provides a label for each coordinate on the map. Therefore, the embodiment can determine whether a vehicle is moving on a highway or not when the semantic map info is combined with the GPS measurements. For every mile a vehicle is moving on a highway, the highway distance count 370 is increased by the processor 130. For every mile the vehicle is traveling in city, the city distance count 380 is increased. Sometimes, when the vehicle is on a highway, because of traffic congestion, the speed and mobility pattern match that in the city. For example, if a vehicle is traveling at a low speed on a highway location (e.g., 15 miles or 25 km per hour), the city distance count can be increased instead. Thus, according to some embodiments of the invention the speed of the vehicle is optionally used to determine the highway distance ratio.

Figure 4:
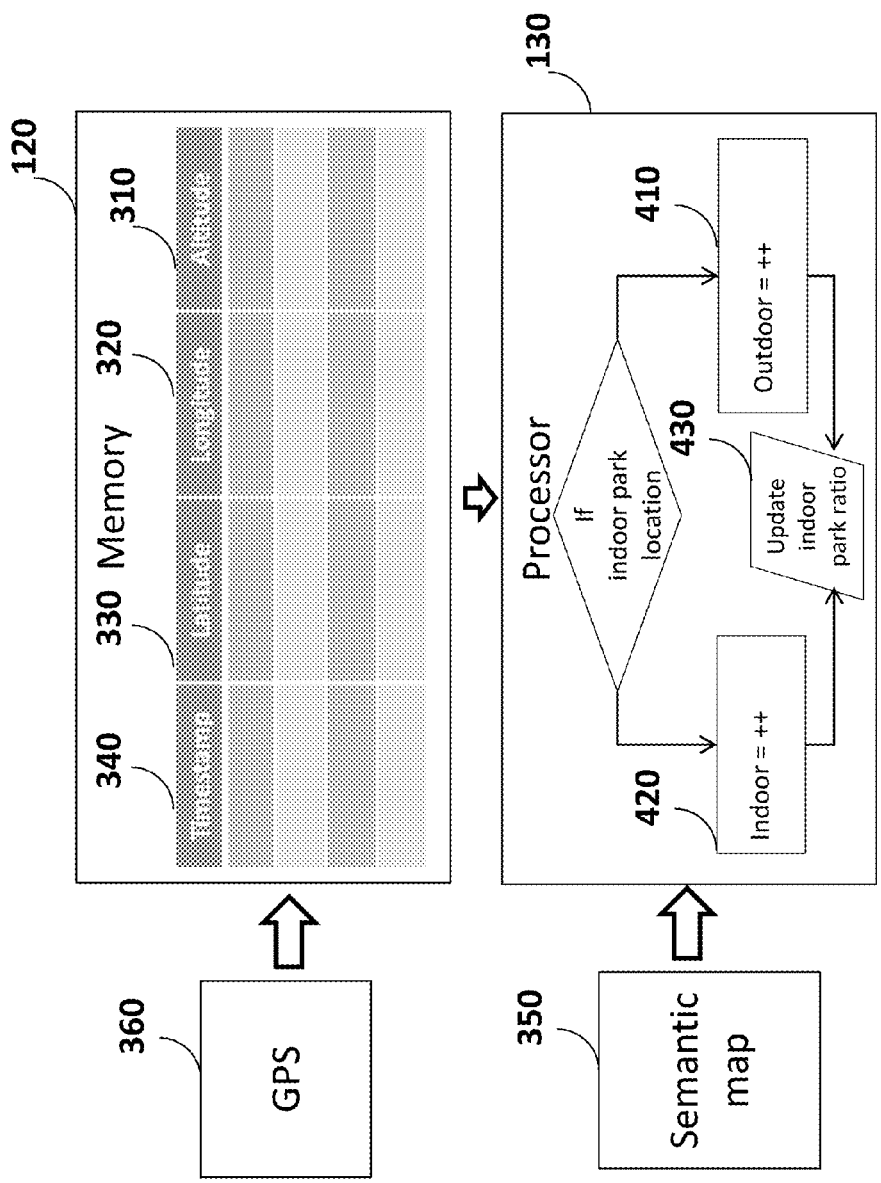
FIG. 4 is a flowchart of a method for determining a ratio of indoor parking versus outdoor parking according to one embodiment of the invention.

FIG. 4 shows a flowchart of a method for determining a ratio of indoor parking versus outdoor parking according to one embodiment of the invention. The ratio can explain different degree of deterioration for vehicles operating in a similar weather conditions. In this embodiment, the set of driving conditions includes a ratio 430 of indoors versus outdoors parking, and the processor identifies the location as a parking location based on a rate of change of the location, identifies a type of the parking location as the indoor parking or the outdoor parking using a map and determines the ratio based on the types of the parking location aggregated for the period of time.

The embodiment in FIG. 4 shows the exemplar use of the GPS sensor 360 for determining indoor 420 versus outdoor time 410 of the vehicle. The embodiment uses a semantic map 350 and a set of GPS information 120, e.g., a timestamp 340, a latitude 330, a longitude 320 and an altitude 310 of the vehicle, to determine if the vehicle is parked indoor or outdoor. Semantic map 350 provides a label for each coordinate on the map. Therefore, some embodiments determine whether a vehicle is indoor or outdoor by combining semantic map info with the GPS info. For example, every time unit (e.g., 1-hour), the vehicle indoor count and outdoor count is updated by the processor 130.

Figure 5:
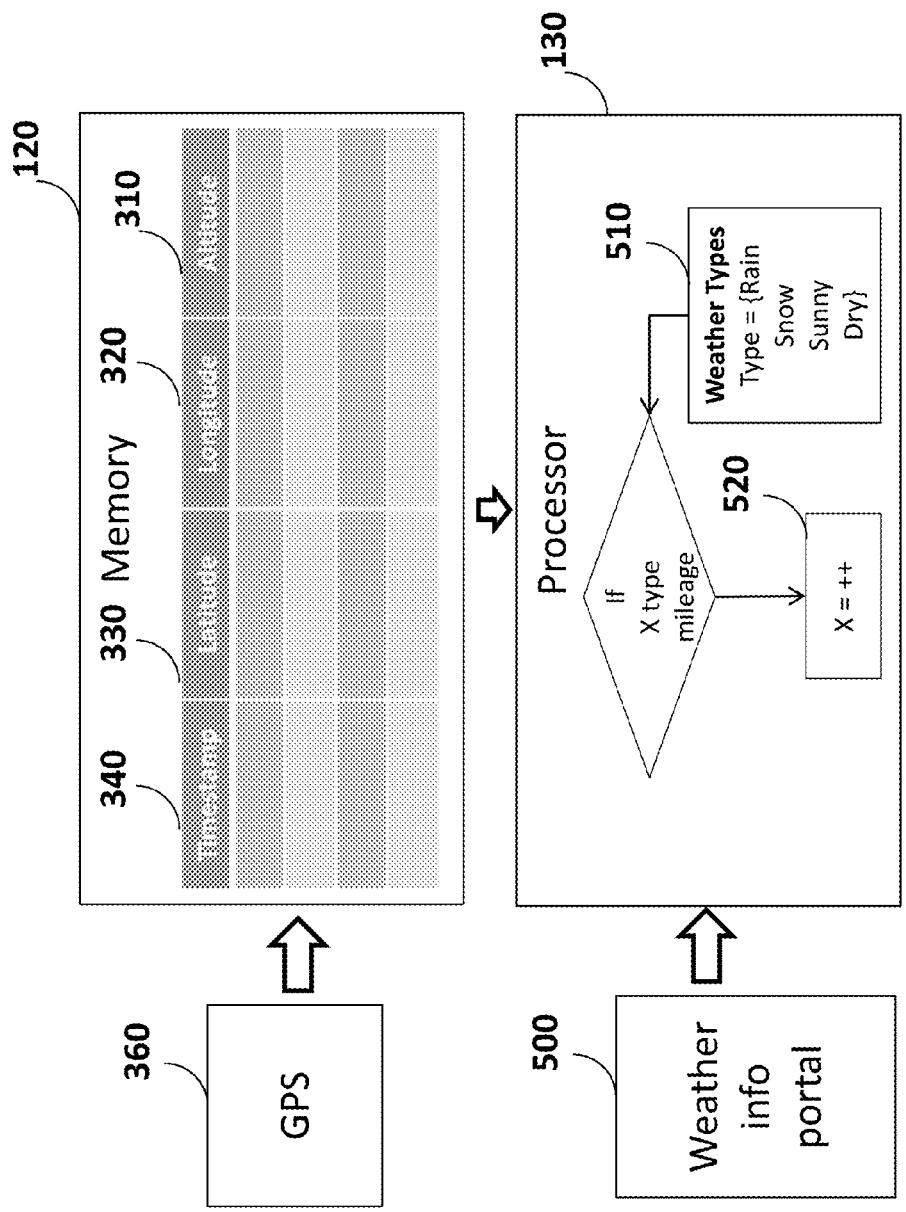
FIG. 5 is a flowchart of a method for using weather condition for distance driven as a driving condition indicator according to some embodiments of the invention.

FIG. 5 shows a flowchart of a method for using weather condition for distance driven as a driving condition indicator according to some embodiments of the invention. For example, in one embodiment, the set of devices includes a temperature sensor for determining an outdoor temperature surrounding the vehicle at the instant of time, and the set of driving conditions includes a parameter indicative of a distribution of temperature for the period of time. Additionally or alternatively, in one embodiment, the set of devices includes a weather module for receiving wirelessly weather conditions at a location of the vehicle at the instant of time, and the set of driving conditions includes a parameter indicative of a distribution of the weather conditions for the period of time. Furthermore, in another embodiment of the invention, the set of devices includes a windscreen wiper sensor for determining speed of movement of at least one windshield wiper of the vehicle at the instant of time, and wherein the set of driving conditions includes a parameter indicative of time of driving under rain within the period of time.

For example, one embodiment can use the GPS sensor 360 for determining outdoor time 410 of the vehicle versus weather condition type 510. The system according to some embodiments of the invention uses a weather portal data 500 and a set of GPS information 120, e.g., a timestamp 340, a latitude 330, a longitude 320 and an altitude 310 of the vehicle, to determine if the vehicle is exposed to certain weather conditions, such as rain or snow. The weather portal data 500 provides a label for each coordinate on the map. Therefore, some embodiments can determine whether a vehicle is driven under the snow and on salted roads. The processor 130 updates for every specified time unit, e.g., 1-hour, the vehicle driving condition 520 based on weather type.

Knowledge of the weather conditions is advantageous for evaluating deterioration of various components of the vehicle. For example, under the snow conditions, salt and grains are spread on roads to prevent icing, which have detrimental effects on vehicles in the form of corrosion, dimples and dents. The model according to one embodiment of the invention captures deterioration of vehicle based on weather condition, because deicing chemicals is one of the sources of vehicle corrosion.

Figure 6:
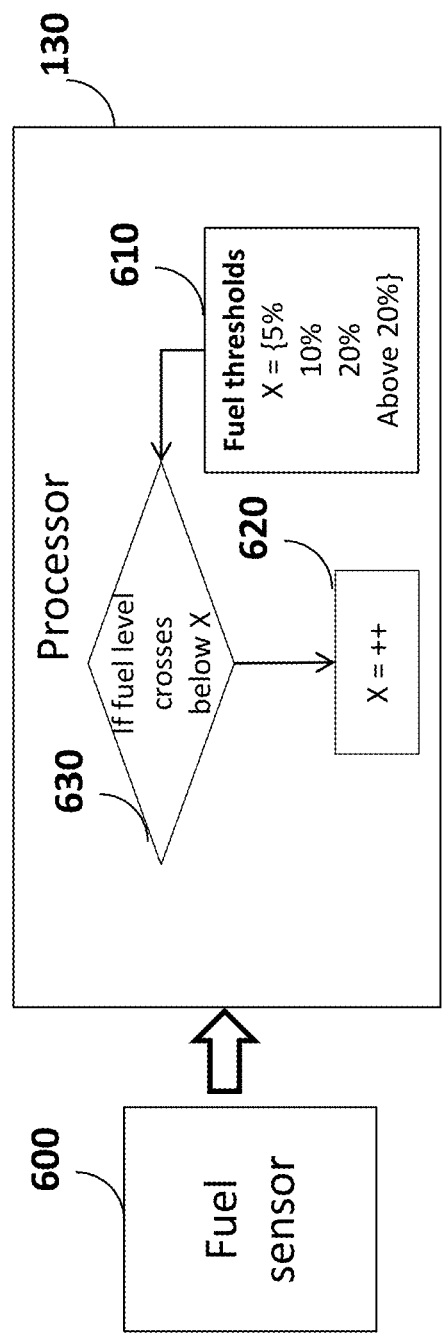
FIG. 6 is a flowchart a method for determining a minimum fuel level histogram or fuel level threshold crossing count as a driving condition indicator of one embodiment of the invention.

FIG. 6 shows a flowchart a method for determining a minimum fuel level histogram or fuel level threshold crossing count as a driving condition indicator of one embodiment of the invention. For example, in this embodiment, the set of devices can include a fuel sensor for determining a level of fuel in the vehicle at the instant of time, and the set of driving conditions includes a parameter indicative of a distribution of the level of fuel in the vehicle for the period of time.

For example, the fuel tank level measured by the fuel sensor 600 can also be considered to be a factor that would impact vehicle condition. As the fuel tank reaches a near zero fuel level, minute particles and debris accumulated at the bottom of the tank would more easily make their way into the injection system and contaminate filters. The processor 130 compares the fuel level to a threshold 610. If the threshold-crossing event 630 occurs, the fuel level critically low indicator 620 is incremented.

Figure 7:
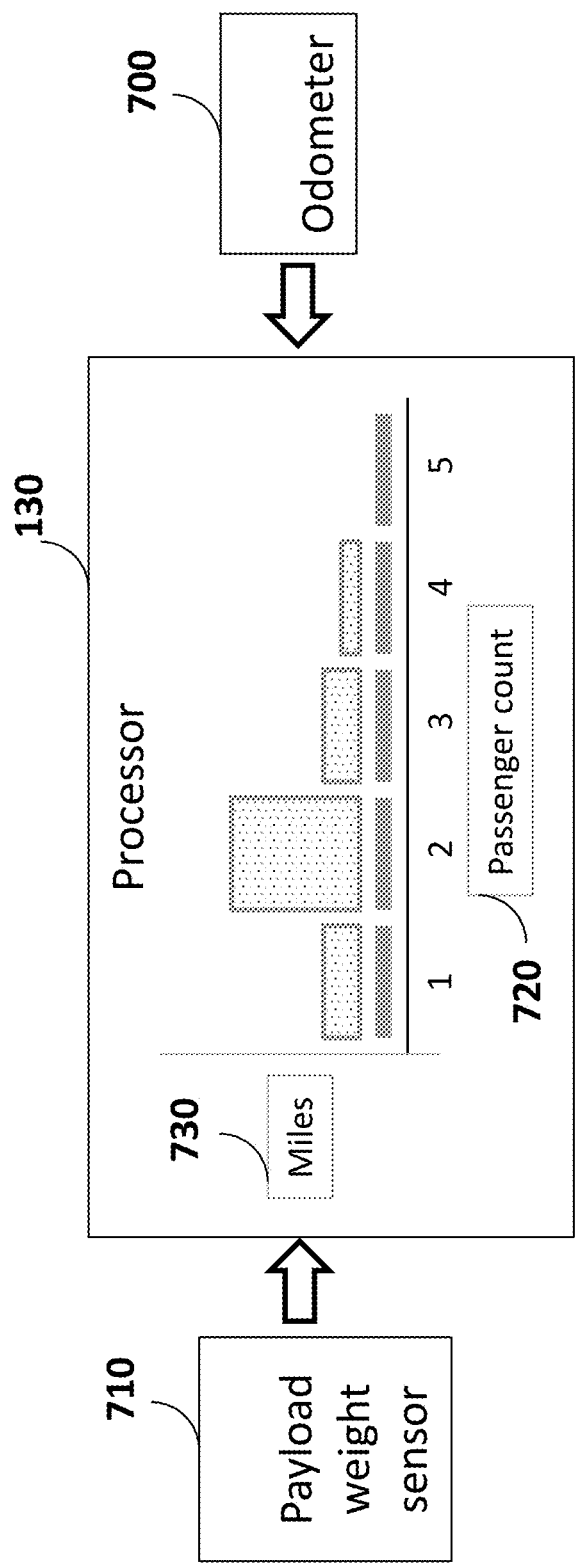
FIG. 7 is a schematic describing passenger count and histogram of total passenger weights for distance driven as a driving condition indicator according to one embodiment of the invention.

FIG. 7 shows a flowchart describing passenger count and histogram of total passenger weights for distance driven as a driving condition indicator according to one embodiment of the invention. This embodiment is based on recognition that the count and weight of the passengers and other load impact the vehicle condition, because every tire has a maximum load capacity determined by how much inflation pressure is actually used for the size of the tire. For example, in one embodiment of the invention, the set of devices includes a weight sensor for determining a weight of the vehicle, and wherein the set of driving conditions includes a parameter indicative of a distribution of the weight of the vehicle within the period of time.

For example, a payload weight sensor 710 can be used to measure the total passenger weight or count. The sensor includes an image sensor and a strain gauge on each seat in the vehicle. The differential change in tire pressures before and after the engine is on can be used to determine the total passenger weight and count during a trip. High passenger weight would impact vehicle condition more negatively, e.g., more wearing and tearing of shock absorbers, tires, and seats. According to some embodiments of the invention, the total number of distance driven 730 for a range of passenger count 720 or weight is derived in the form of a histogram. Additionally or alternatively, the percentage of distance driven under different weight profiles can be quantified via a histogram.

Figure 8:
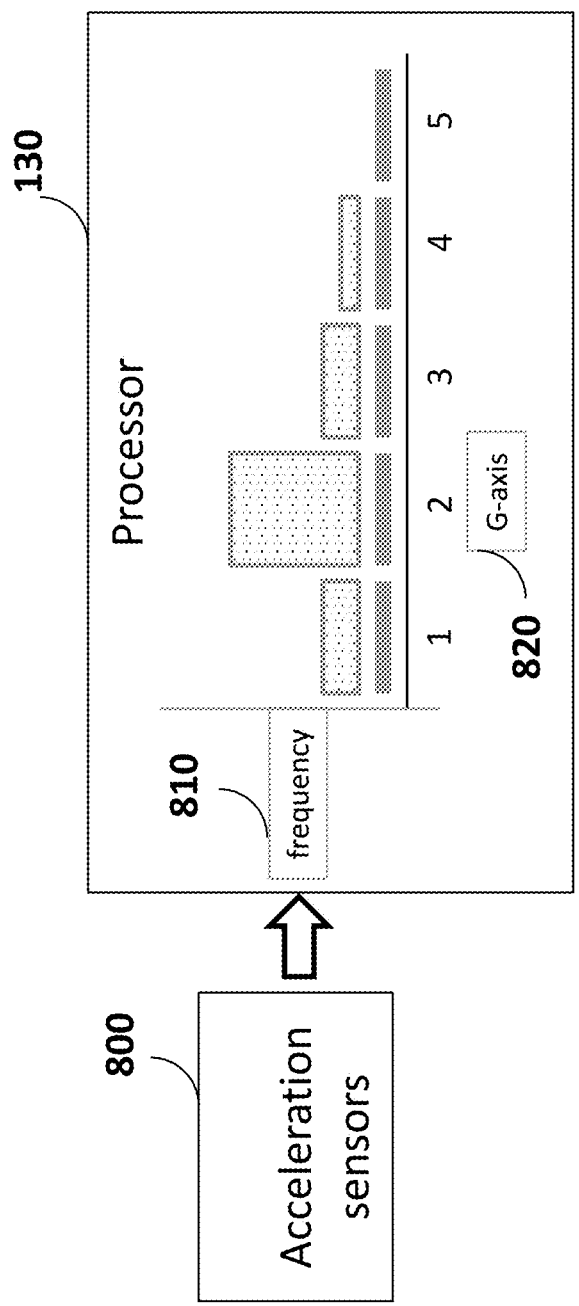
FIG. 8 is a schematic of a method for determining an acceleration and/or shock impulses according to some embodiments of the invention.

FIG. 8 shows a flowchart of a method for determining an acceleration and/or shock impulses according to some embodiments of the invention. For example, in one embodiment, the set of devices includes a shock absorber sensor for determining a parameter indicative of a shock impulse acting on the vehicle at the instant of time, and the set of driving conditions includes a parameter indicating amount of excessive shock impulses acted on the vehicle within the period of time.

Additionally or alternatively, in another embodiment, the set of devices includes a wheel column sensor for determining one or combination of acceleration and force acting on a wheel column at the instant of time, and the set of driving conditions includes a parameter indicating amount of excessive force acted on the wheel column within the period of time.

For example, the embodiment can determine acceleration sensor output g levels versus frequency of occurrence for each sensor axis as a driving condition indicator. In almost every vehicle today there are multi-axis acceleration sensors 800. The processor 130 reads the data from each axis of the acceleration sensor 800 and records the corresponding gravity-force in units of meters per square seconds (m/s$^2$) to detect sudden brakes in the form of a histogram to estimate degradation of brake pads and loss of braking effectiveness.

Evaluating Vehicle Components

Figure 9:
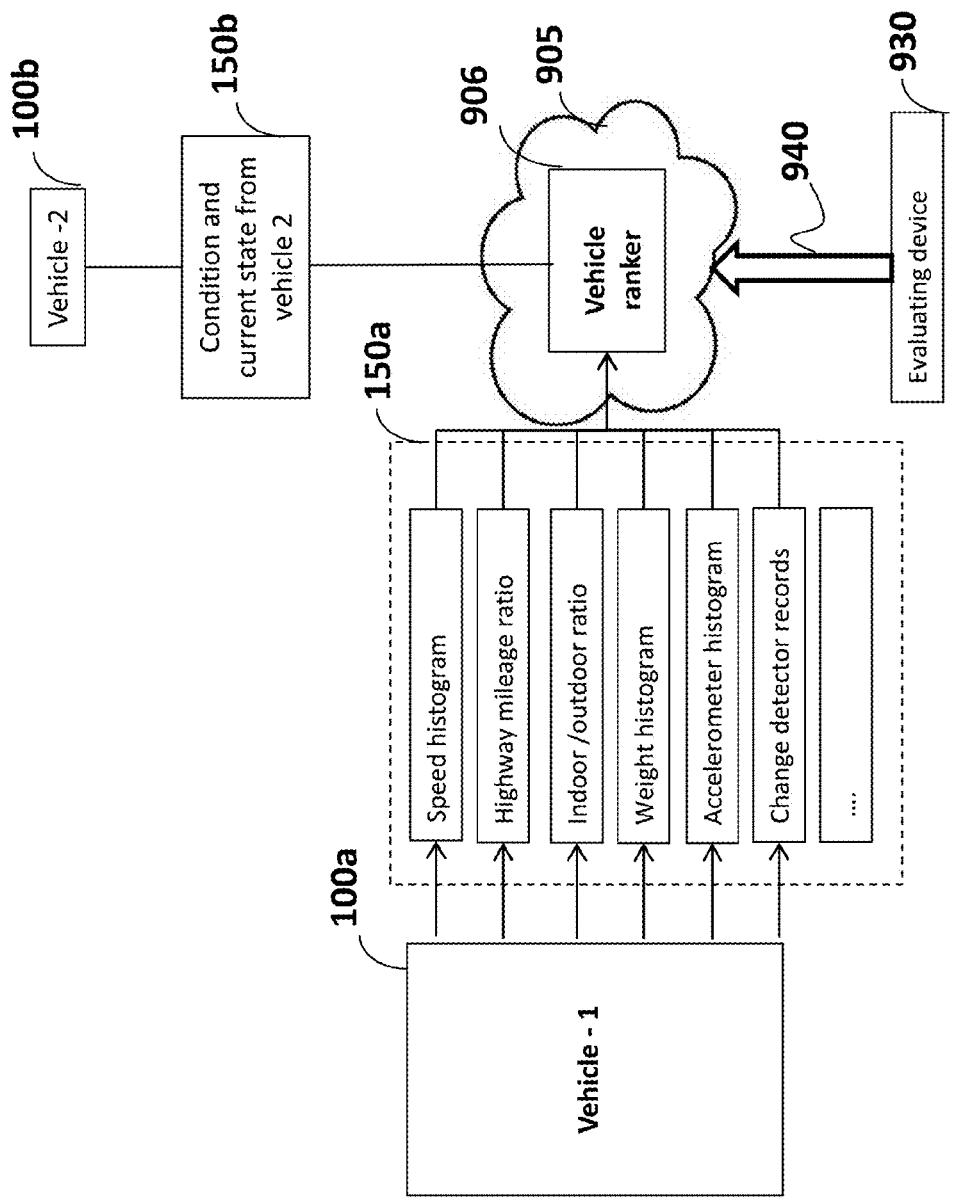
FIG. 9 is a block diagram of a system for determining relative conditions of the vehicles according to some embodiments of invention.

FIG. 9 shows a block diagram of a system for determining relative conditions of the vehicles according to some embodiments of invention. Using the current state and condition information accordingly, some embodiments rank multiple vehicles in terms of multiple metrics representative of the vehicle current state and condition. The current state and vehicle condition information 150*a* from a vehicle 150*a* and the current state and vehicle condition information 150*b* from another vehicle 150*b* are compared according to some embodiment of the invention by the vehicle ranker algorithm 906, e.g., implemented on the cloud 905. The ranker 906 can also exploit different preferences 940 submitted from a device 930. More than two vehicles can be compared for valuation and ranking using their current state and condition information 150.

Figure 10:
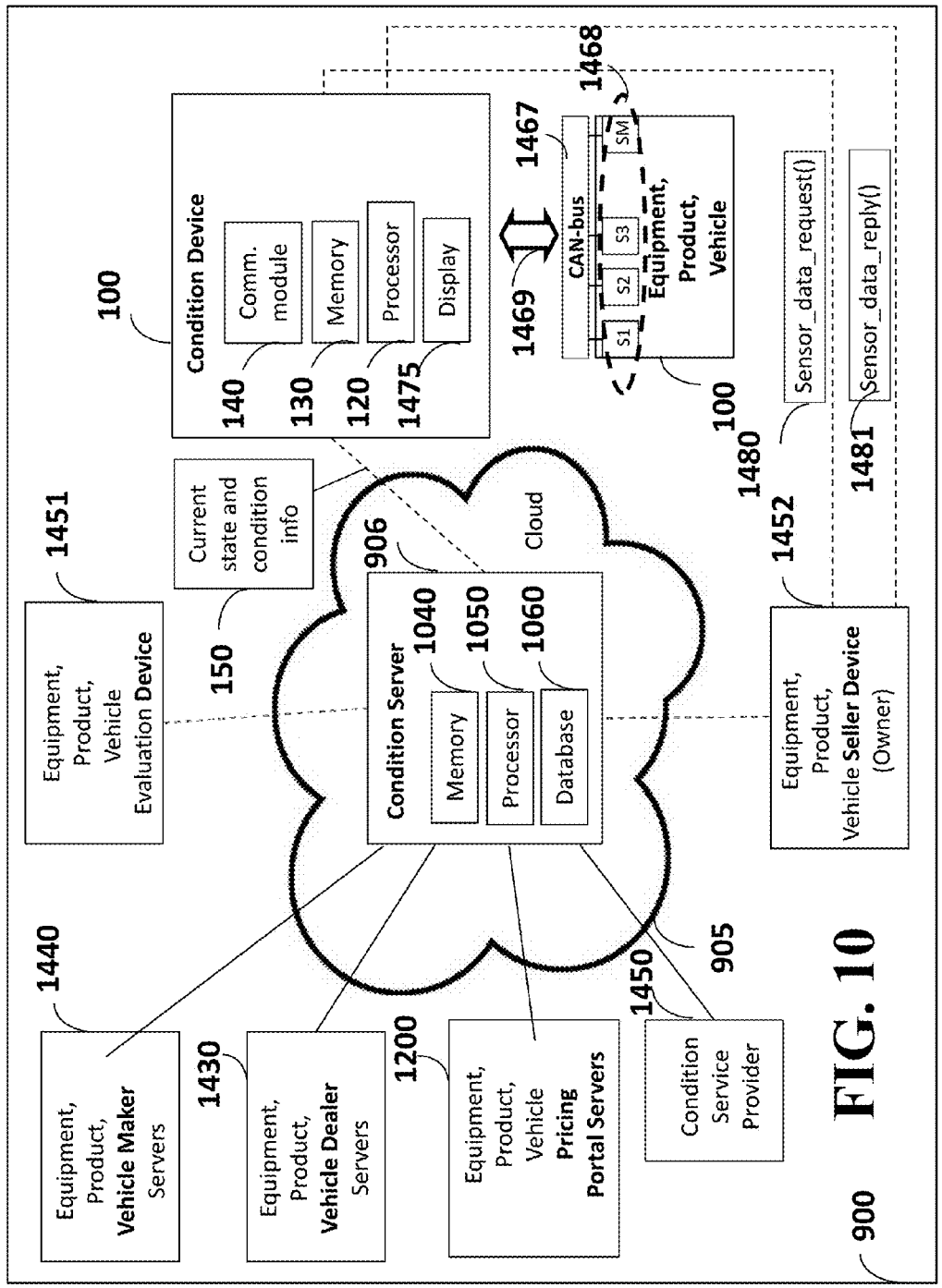
FIG. 10 is a schematic of interactions within a connectivity system according to one embodiment of the invention.

FIG. 10 shows a schematic of interactions within a connectivity system 900 according to one embodiment of the invention. The system includes a condition server 906 that implements vehicle ranker, e.g., on a cloud computing 905, and can interact with different systems such as vehicle maker servers 1440, vehicle communication module 140, vehicle dealer servers 1430, equipment portals and 1200, vehicle evaluation devices 1451, vehicle manufacturer/seller devices 1452 and the unit 100.

In some embodiments of the invention, the testing and evaluating the components of the vehicle is performed by a system in communication with the communication module of the vehicle. The system receives the current state and the driving conditions of the vehicle and determines a condition of the vehicle based on a function of the current state and the driving conditions.

In some embodiment the system is a remote system in communication with the vehicle over a wireless interface. In alternative embodiment, the system is implemented by various components of the vehicle. For example, the system can be in wired or wireless communication with the processor 120 and the memory 130, or can be even implemented using the processor 120. In some embodiments, the system is implemented in a distributed manner.

In some embodiments, the vehicle also includes a display 1475 for rendering the results of the evaluation. The display can also render the valuation of the vehicle and its relative ranking with respect to the other vehicles in the marketplace is performed by the condition server 906 in the cloud 905. The condition device reads data 1469 from the sensors on the vehicle 1468 over a controller area network (CAN-bus) connection 1467, and then computes the current state and condition information 150, which are then passed to the condition server 906.

The condition server 906 includes memory units 1040, processor 1050 and database 1060. The connectivity between the external servers (1010, 1020, 1030) can be over the Internet. The connectivity between the vehicle communication unit 140 and the condition server 906 can employ cellular communication or the Internet via WiFi. Vehicle maker servers 1010 can provide the condition server 906 with vehicle trim information including, e.g., make, model, color, accessories, electro-mechanical features, recall info, for each unique vehicle identification number. The vehicle dealer servers 1020 can provide the condition server with information including performed vehicle services and future service needs and their corresponding attributes. Pricing portals 1200 provide transaction based pricing of vehicles.

Figure 11:
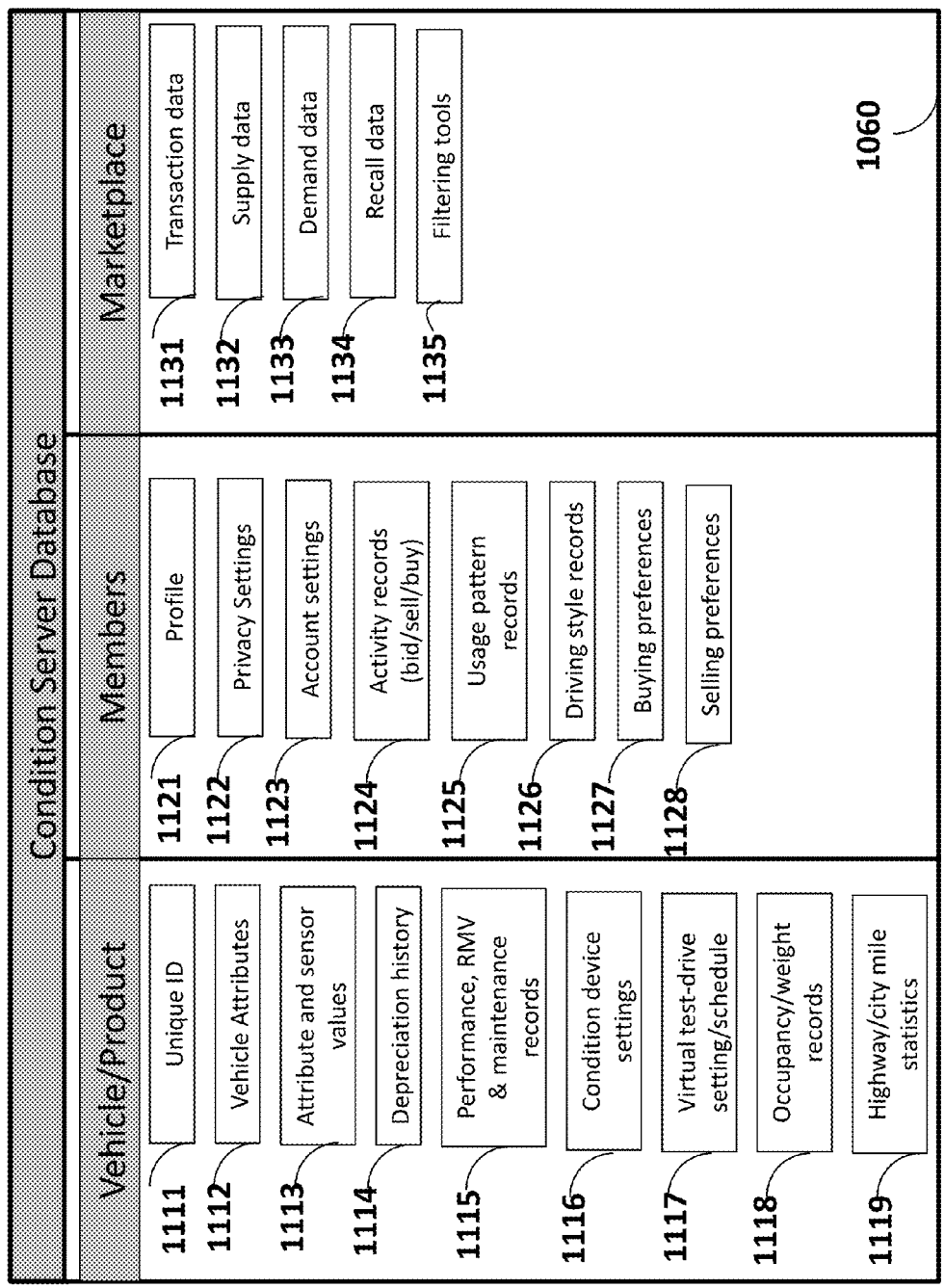
FIG. 11 is a schematic of a data structure of the database of the condition server according to one embodiment of the invention.

FIG. 11 shows a data structure of the database 1060 of the condition server 906 according to one embodiment of the invention. For example, the database 1060 can include three sub-databases, namely vehicle/product/equipment sub-database, member info sub-database and marketplace sub-database.

The vehicle/product sub-database includes, for each member vehicle, the followings. The sub-database can include a unique identification number 1111, e.g., IP V6 address of the value-meter device, vehicle identification number (VIN) of the vehicle. For example, the value-meter device can read VIN of a vehicle directly from the vehicle CAN-bus interface. The sub-database can also include vehicle attributes 1112 such as make, model, year, color, trim, location. This information can be entered once into the value-meter device at the time of installation and then uploaded to the database.

The sub-database can also include vehicle sensor values 1113, such as distance fuel level statistics, e.g., minimum fuel level, refill start level, refill stop level, refill start level distribution, refill stop level distribution, failed sensors. By periodically or a-periodically reading the fuel level from the vehicle CAN-bus 1467, the unit 100 can derive fuel statistics. Notably, any jump increase in fuel level while the vehicle is in stop is due to refilling. When a tank is near empty, dusts and particles on the bottom of the tank are likely to make their way into the injection system and cause engine performance issues in time. Refilling at a high start level is recommended. Condition device uploads these measurements to the condition server for the subject vehicle.

The sub-database can also include distance records and statistics 1119, such as current distance, highway distance, city distance, and GPS and weather related statistics, such as the total time driven under rain, total time driven in snow, outdoor to indoor stay ratio. For example, the city driving typically involves rough roads and potholes negatively effecting suspension, engine, and brakes of the vehicle. However, highway roads are smoother and vehicles depreciate slower compared to the vehicles with city mileage. There is currently no solution to exactly determine the break-down of city and highway distances of a vehicle. The unit 100 uses on-board GPS receiver to classify any commuted mile into city mile or highway mile. Thus, some embodiment makes possible to determine the percentage of highway distance of a vehicle.

The sub-database can also include occupancy & weight records and statistics 1118, such as average total passenger weight per mile, minimum total passenger weight per mile, maximum total passenger weight per mile, the number of distance versus total passenger weight distribution. The unit 100 can use different approaches to determine the number of people within a vehicle. One way is to use microphones on the device and perform speech recognition while the vehicle is in motion. The second option is to use an imaging sensor and image processing algorithms for face detection. Speech and face recognition algorithms are becoming widespread with their high performance. Higher weight induces more stress on vehicle components, therefore accelerates wearing and tearing.

The sub-database can also include depreciation history 1114 based on transactions data from pricing portals 1200. The condition server retrieves depreciation history of a particle vehicle type and configuration from other web portals using their application programming interface. The sub-database can also include vehicle performance 1115, such as acceleration, accident record, engine noise, CO2 emission levels, miles per gallon, or km per liter, and condition device settings 1116 such as privacy settings, sensor reading update frequency or period, and profile settings.

In some embodiments, the sub-database can also include virtual test-drive requests, responses, settings and schedules 1117. The condition system 900 in FIG. 10 can allow to offer a remote test-drive of the vehicle. Once a test drive is scheduled via the condition system, the information from the desired sensors on the subject vehicle can be monitored in real-time. First, the sensor values from the vehicle 1469 are streamed onto the condition server 906 on the cloud. Then, the sensor data 1469 are retrieved in real-time on the vehicle evaluation device 1451.

The members sub-database can include, for each member vehicle, a member profile 1121, e.g., age, gender, name, geo-location, a privacy settings 1122, an account setting 1123 and activity records 1124. For example, data and/or attributes of the vehicle can be stored on the value-meter server and available to value-meter subscribers. Vehicle owners can have control over what information should be treated as private such as the name of owner, zip code. The value-meter system allows potential sellers to be able to proactively request information about the vehicles of interest.

The members sub-database can also include a driving style 1126, such as statistics of sharp cornering, sudden brakes and sudden acceleration, highway distance and city distance breakdowns, and tailgating statistics requiring distance measurement sensors in the front of a vehicle. The members sub-database can also include other preferences such as preferences 1127 comprising make, model, year, distance, vehicle features and preferences 1128 comprising particulars of the vehicle offerings.

The marketplace sub-database can include transaction data 1131, such as price and vehicle information based on sale transactions that took place in the regular marketplace. The marketplace sub-database can also include supply 1132 and demand 1133 data for specifying the availability and demand for vehicle evaluation and ranking. The marketplace sub-database can also include recall data 1134, e.g., vehicle make, model, year, and recall reason, and filtering tools 1135, comprising capabilities to retrieve marketplace data for certain vehicle categories, distance range, location, vehicle age range, and transaction prices.

Vehicle Valuation and Ranking

According to some embodiments of the invention, the parameters of the state of the vehicle include parameters indicative of conditions of components of the vehicle and parameters indicative of conditions of the operation of the vehicle and components of the vehicle at the instant of time. For example, one embodiment groups parameters of the state of the vehicle in a feature vector x for use in vehicle valuation and ranking. These feature variables can be categorical, such as color, or continuous variables, such as distance. For example an i-th dimension of feature vector, $x(i)$, can represent a categorical vehicle color variable where values 0, 1, 2, 3 can correspond to black, white, blue, red colors respectively. Similarly a j-th dimension of feature vector, $x(j)$, can represent a continuous vehicle distance variable. Some implementations convert the categorical variables to binary variables such that if there are k categories, k new binary variables are defined, one for each category. Only the category variable corresponding to the vehicles category is set to 1 while others are kept 0. This description still refers to this converted feature vector as x. The feature vector is used to determine a valuation, ranking or a customized ranking of a vehicle by using valuation, ranking or customized ranking functions.

Valuation Function

In one embodiment, a valuation function, $F(x)$, determines an absolute value of a vehicle. This function maps feature vector associated with a vehicle to an absolute value. Value of a vehicle can have various alternative meanings. In one embodiment the value means the market price of a car in terms of a standard currency. In a different embodiment, the value represents the mechanical score of a vehicle where a car with perfect condition maps to a maximum score and cars with worse conditions have gradually lower scores.

In different embodiments, the valuation function is a regression function and can have many different forms such as linear functions, log-linear functions, polynomial functions, regression trees, regression forests, kernel functions, support vector regression, relevance vector regression, neural networks, nearest neighbor regressors, and combination thereof.

The valuation function can be set by a human expert or can be learned using training data. In one embodiment the valuation function is learned using training data, $\{(x_i, y_i)\}_{i=1 \ldots n}$, containing feature vectors $x_i$ and corresponding values $y_i$ of n vehicles. During the training, an optimization procedure is solved:

$$\bar{F} = \arg\min_{F} \Sigma_{i=1}^{n} c\|F(x_i) - y_i\|^2 + \|F\|$$

to minimize the difference between the value estimations by the valuation function $F(x_i)$ and the true values $y_i$. The term $\|F\|$ is a regularizer which prevents overfitting the training data and c is a tradeoff between the training error and regularizer.

In one embodiment the valuation function is written as a linear function $F(x)=w^Tx$. In linear support vector regression problem, optimization is written as a soft-margin optimization $$\min \frac{1}{2}\|w\|^2 + c\sum_{i}^{n}(\epsilon_i^2 + \hat{\epsilon}_i^2)$$

subject to $y_i - w^T x_i \leq \epsilon + \epsilon_i \ \forall \ (x_i, y_i)$ $w^T x_i - y_i \leq \epsilon + \hat{\epsilon}_i \ \forall \ (x_i, y_i)$ $\epsilon_i, \hat{\epsilon}_i \geq 0$ The optimization finds a linear regression vector w that minimizes the difference between predictions and true values while maximizing a margin. Extension of this model to non-linear regression is given by kernel mapping $K(x_i, x_j)$ where the regression function can be written as $$F(x) = \sum_{i}^{n}(\hat{\alpha}_i - \alpha_i)K(x_i, x)$$

where $\hat{\alpha}_i$ and $\alpha_i$ are multipliers learned through the dual optimization $$\max \sum_{i=1}^{n} y_i(\alpha_i - \hat{\alpha}_i) - \epsilon \sum_{i=1}^{n}(\alpha_i - \hat{\alpha}_i) - \frac{1}{2}\sum_{i}^{n}\sum_{j}^{n}(\alpha_i - \hat{\alpha}_i)(\alpha_j - \hat{\alpha}_j)K(x_i, x_j)$$

subject to $\sum_{i=1}^{n}(\alpha_i - \hat{\alpha}_i) = 0$ $\alpha_i, \hat{\alpha}_i \geq 0$ $0 \leq \alpha_i, \hat{\alpha}_i \leq c$ If the kernel function is positive definite this optimization is a convex optimization and can be solved optimally using standard continuous optimization schemes such as interior point methods.

Ranking Function

Some embodiments use ranking functions to determine the relative utility of a vehicle with respect to the other vehicles. A ranking function rates the vehicles with overall better utility over the cars that have lower utility. The utility function can use a combination of a price and other features. In one embodiment, the time of sale of a car from introduction to the market is used to determine the utility of a car relative to the other cars.

Let x to represent the feature vector of the car including the price. The ranking function can be a regression function with many different forms such as linear functions, log-linear functions, polynomial functions, regression trees, regression forests, kernel functions, support vector regression, relevance vector regression, neural networks, nearest neighbor regressors, and combination thereof. The ranking function can be set by a human expert or can be learned using training data. In one embodiment the valuation function is learned using training data, $\{(x_i, x_j)\}_{i,j=1 \ldots n}$, including feature vectors $x_i$ and $x_j$ with the relationship that the i-th vehicle has better utility that j-th vehicle.

In one embodiment the ranking function is written as a linear function $F(x)=w^Tx$. In linear support vector ranking problem, optimization is written as a soft-margin optimization $$\min \frac{1}{2}\|w\|^2 + c\sum_{\forall i,j}(\epsilon_{i,j})$$

subject to $w^T x_i \geq w^T x_j + 1 - \epsilon_{i,j} \ \forall \ (x_i, x_j)$ such that $y_i > y_j$ $\epsilon_{i,j} \geq 0$ The optimization finds a linear regression vector $w^T$ that ranks the vehicles with higher utilities higher ($y_i > y_j$) while maximizing a margin.

Extension of this model to non-linear regression is given by kernel mapping $K(x_i, x_j)$ where the regression function can be written as $$F(x) = \sum_{i}^{n}(\alpha_{ij})K(x_i - x_j, x)$$

where $\alpha_{ij}$ are multipliers learned through the dual optimization [2]

$$\max \sum_{i=1}^{n}(\alpha_{ij}) - \sum_{i,j}\sum_{u,v}(\alpha_{ij})(\alpha_{uv})K(x_i - x_j, x_u - x_v)$$

subject to $0 \leq \alpha_{ij} \leq c$

If the kernel function is positive definite this optimization is a convex optimization and can be solved optimally using standard continuous optimization schemes such as interior point methods.

Customized Ranking Function

In some embodiments of the invention, the ranking function can be different for different vehicles when certain vehicle features or components are more important than other features. Customized ranking function is a function that ranks vehicles differently for each user or with respect to groups of different user types. Users are classified into a fixed number of user types using a classifier function. This is achieved by asking several questions to the users. User answers are used as features to the classifier function and the function assigns a category to each user. The classification function can have many different forms such as decision trees, decision forests, and linear classifiers.

During training a separate ranking function can be learned for each category. For example, while using the ranking function, the same questions are asked to the user and the user is classified into one of the categories. Customized ranking for that user is then generated using the ranking function of that category.

Ranking Example

Figure 12:
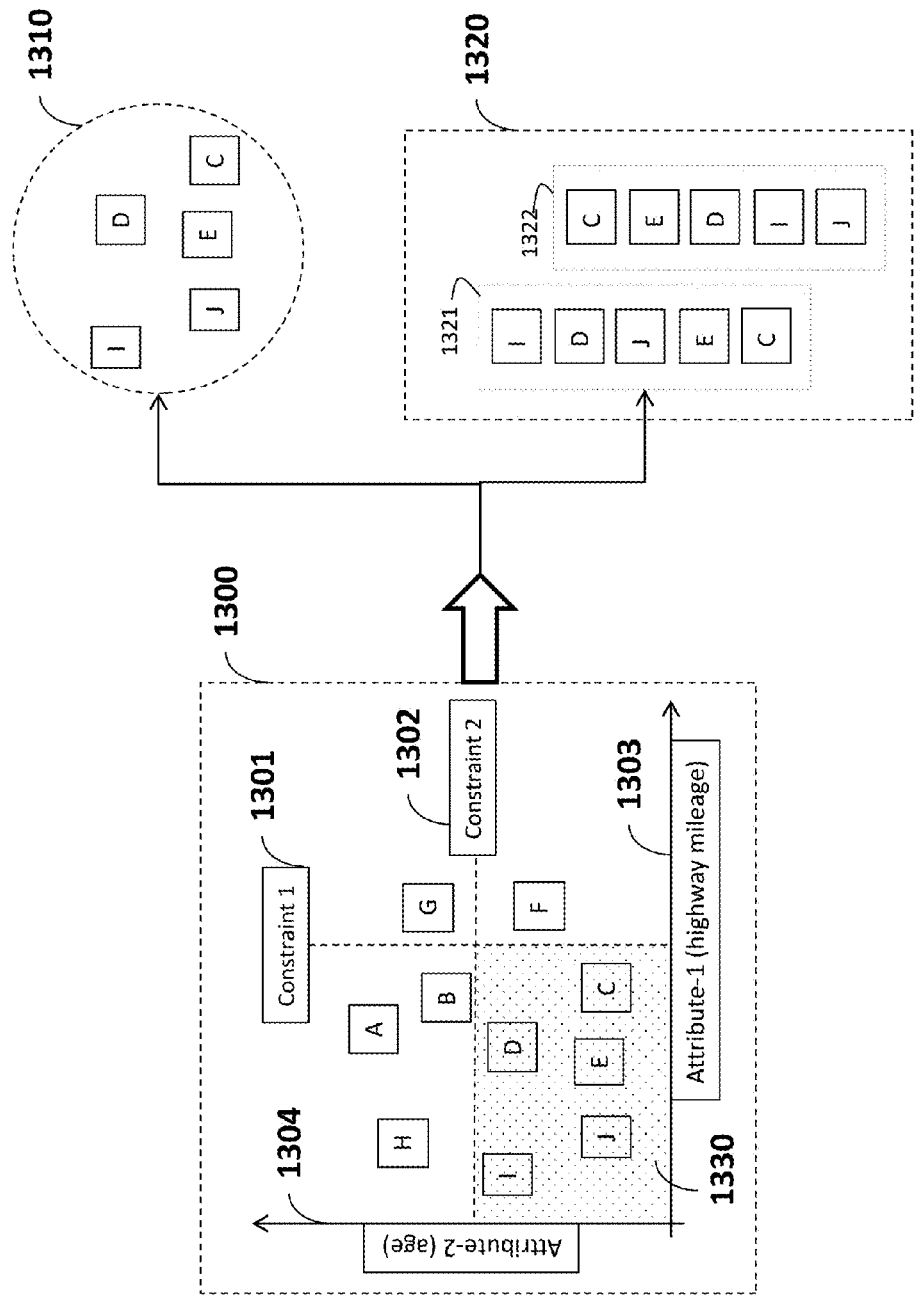
FIG. 12 is a schematic of an example of determining relative vehicle condition according to some embodiments of invention.

FIG. 12 shows an example of determining relative vehicle condition according to some embodiments of invention. This example compares the vehicles that satisfy two constraints, i.e., a constraint 1301 specifying the highest distance for a vehicle and constraint 1302 specifying the highest age for a vehicle. Therefore, the search takes place in two dimensions, i.e., the age 1304 and distance 1303 of the vehicle. In this example, the search space includes vehicles A, B, C, D, E, F, G H, I, J with different distance and age values, with vehicles I, D, J, E and C satisfying the constraints.

Without the ranking function, the vehicle ranking would list vehicles that would satisfy both constraints, including vehicles I, D, J, E and C. However, the age and distance can affect different components of the vehicle differently. In addition, different driving condition can further be used to compare the vehicle. The condition system 900 according to one embodiment of the invention can rank 1321 and/or 1322 the vehicles within the feasible region according to driving conditions and other preferences specifying the weight of those driving conditions.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools.

Also, the embodiments of the invention may be embodied as a method, of which an example has been provided. The steps performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A vehicle, comprising: a set of devices for determining a state of the vehicle at an instant of time, the set of devices includes an odometer for determining a total distance traveled by the vehicle at the instant of time; a processor for processing parameters of the state of the vehicle collected over a plurality of instances of time for a period of time from an initial instance of time till a current instant of time to determine a set of driving conditions leading to a current state of the vehicle at the current instant of time, such that each driving condition indicates a condition of an operation of the vehicle for the period of time; and a communication module for outputting to a system the current state of the vehicle determined by the set of devices at the current instant of time and for outputting the set of driving conditions leading to the current state of the vehicle, wherein the system is in communication with a set of vehicles including a first vehicle and a second vehicle, the system comprising: a receiver for receiving a current state and driving conditions of the first vehicle and for receiving a current state and driving conditions of the second vehicle; a processor for determining conditions of the first vehicle and the second vehicle with respect to each other, wherein the determining is based on a function of the current state and the driving conditions of the first vehicle and the second vehicle, wherein the function is a regression function learned using training data specifying comparative relationship of utilities of different vehicles having different states and driving conditions; and a display for rendering results of evaluation of the first vehicle and the second vehicle with respect to each other.

2. The vehicle of claim 1, wherein the set of devices includes one or combination of a temperature sensor for determining an outdoor temperature surrounding the vehicle at the instant of time;

a weather module for receiving wirelessly weather conditions at a location of the vehicle at the instant of time;

a global positioning system (GPS) for determining the location of the vehicle at the instant of time;

a fuel sensor for determining a level of fuel in the vehicle at the instant of time;

a windscreen wiper sensor for determining speed of movement of at least one windshield wiper of the vehicle at the instant of time;

a shock absorber sensor for determining a parameter indicative of a shock impulse acting on the vehicle at the instant of time;

a wheel column sensor for determining one or combination of an acceleration and a force acting on a wheel column at the instant of time;

an accelerometer for determining an acceleration or deceleration of the vehicle at the instant of time.

3. The vehicle of claim 1, wherein the set of devices includes a global positioning system (GPS) for determining a location of the vehicle at the instant of time, and wherein the set of driving conditions includes a ratio of city versus highway distance, wherein the processor identifies a type of the location as a city location or a highway location using a map and determines the ratio based on the types of the location aggregated the period of time.

4. The vehicle of claim 1, wherein the set of devices includes a global positioning system (GPS) for determining a location of the vehicle at the instant of time, and wherein the set of driving conditions includes a ratio of indoors versus outdoors parking, wherein the processor identifies the location as a parking location based on a rate of change of the location, identifies a type of the parking location as the indoor parking or the outdoor parking using a map and determines the ratio based on the types of the parking location aggregated for the period of time.

5. The vehicle of claim 1, wherein the set of devices includes a temperature sensor for determining an outdoor temperature surrounding the vehicle at the instant of time, and wherein the set of driving conditions includes a parameter indicative of a distribution of temperature for the period of time.

6. The vehicle of claim 1, wherein the set of devices includes a weather module for receiving wirelessly weather conditions at a location of the vehicle at the instant of time, and wherein the set of driving conditions includes a parameter indicative of a distribution of the weather conditions for the period of time.

7. The vehicle of claim 1, wherein the set of devices includes a fuel sensor for determining a level of fuel in the vehicle at the instant of time, and wherein the set of driving conditions includes a parameter indicative of a distribution of the level of fuel in the vehicle for the period of time.

8. The vehicle of claim 1, wherein the set of devices includes a windscreen wiper sensor for determining speed of movement of at least one windshield wiper of the vehicle at the instant of time, and wherein the set of driving conditions includes a parameter indicative of time of driving under rain within the period of time.

9. The vehicle of claim 1, wherein the set of devices includes a weight sensor for determining a weight of the vehicle, and wherein the set of driving conditions includes a parameter indicative of a distribution of the weight of the vehicle within the period of time.

10. The vehicle of claim 1, wherein the set of devices includes a shock absorber sensor for determining a parameter indicative of a shock impulse acting on the vehicle at the instant of time, and wherein the set of driving conditions includes a parameter indicating amount of excessive shock impulses acted on the vehicle within the period of time.

11. The vehicle of claim 1, wherein the set of devices includes a wheel column sensor for determining one or combination of an acceleration and a force acting on a wheel column at the instant of time, and wherein the set of driving conditions includes a parameter indicating amount of excessive force acted on the wheel column within the period of time.

12. The vehicle of claim 1, wherein the set of devices includes an accelerometer for determining an acceleration or deceleration of the vehicle at the instant of time, and wherein the set of driving conditions includes a parameter indicating amount excessive acceleration or deceleration of the vehicle within the period of time.

13. A system in communication with a set of vehicles including a first vehicle and a second vehicle, wherein the system receives a current state and driving conditions of each vehicle, wherein each vehicle comprises: a set of devices for determining a state of the vehicle at an instant of time, the set of devices includes an odometer for determining a total distance traveled by the vehicle at the instant of time; a processor operatively connected to a memory for processing parameters of the state of the vehicle collected over a plurality of instances of time for a period of time from an initial instance of time till a current instant of time to determine a set of driving conditions leading to a current state of the vehicle at the current instant of time, such that each driving condition indicates a condition of an operation of the vehicle for the period of time; and a communication module for outputting the current state of the vehicle determined by the set of devices at the current instant of time and for outputting the set of driving conditions leading to the current state of the vehicle, the system comprising: a receiver for receiving a current state and driving conditions of the first vehicle and for receiving a current state and driving conditions of the second vehicle; a processor for determining conditions of the first vehicle and the second vehicle with respect to each other, wherein the determining is based on a function of the current state and the driving conditions of the first and the second vehicles, wherein the function is a regression function learned using training data specifying comparative relationship of utilities of different vehicles having different states and driving conditions; and a display for rendering results of evaluation of the first vehicle and the second vehicle with respect to each other.

14. The system of claim 13, wherein the system receives, determines and renders results of evaluation of more than two vehicles.

15. The system of claim 14, wherein the regression function compares one or combination of a ratio of city versus highway distance for the first and the second vehicles, a ratio of indoor versus outdoor parking for the first and the second vehicles, a distribution of the weather condition over period of time for which the first and the second vehicles travel that total distance.

16. The system of claim 15, wherein the regression function is a linear function $F(x)=w^T x$, wherein a linear regression vector w ranks the vehicles in the set according to its feature vector x.

17. The system of claim 16, wherein the linear regression vector w is learned by solving a soft-margin optimization problem $$\min \frac{1}{2}\|w\|^2 + c\sum_{\forall i,j}(\epsilon_{i,j})$$

subject to $w^T x_i \geq w^T x_j + 1 - \epsilon_{i,j}$ $\forall (x_i, x_j)$ such that $y_i > y_j$ $$\epsilon_{i,j} \geq 0$$

wherein $x_i$ and $x_j$ are features of two vehicles in the set, $y_i$ and $y_j$ are utilities of the vehicles cars, and $\epsilon_{i,j}$ are slack variables of the optimization problem corresponding to ranking errors.

* * * * *